US008304687B2

(12) United States Patent
Amorosi et al.

(10) Patent No.: US 8,304,687 B2
(45) Date of Patent: Nov. 6, 2012

(54) PROCESS AND APPARATUS FOR SPOT WELDING WITH A LASER BEAM

(75) Inventors: Simone Amorosi, Ecublens (CH); Ronald Gianotti, Echichens (CH); Hans Peter Schwob, Uetendorf (CH); Thomas Sidler, Cossonay (CH); Christian Wissing, Bern (CH)

(73) Assignee: Lasag AG, Thun (CH)

( * ) Notice: Subject to any disclaimer, the term of this patent is extended or adjusted under 35 U.S.C. 154(b) by 2023 days.

(21) Appl. No.: 10/840,603

(22) Filed: May 7, 2004

(65) Prior Publication Data

US 2004/0226923 A1    Nov. 18, 2004

(30) Foreign Application Priority Data

May 13, 2003    (EP) .................................... 03010716

(51) Int. Cl.
*B23K 26/00*    (2006.01)
(52) U.S. Cl. ......... 219/121.63; 219/121.64; 219/121.65; 219/121.66
(58) Field of Classification Search ............. 219/121.63, 219/121.64, 121.85, 121.65, 121.66, 121.6
See application file for complete search history.

(56) References Cited

U.S. PATENT DOCUMENTS

| 4,825,035 | A |   | 4/1989 | Moriyasu et al. |
| 5,380,978 | A | * | 1/1995 | Pryor ........................ 219/121.64 |
| 5,681,490 | A | * | 10/1997 | Chang ....................... 219/121.64 |
| 6,018,729 | A | * | 1/2000 | Zacharia et al. ................. 706/21 |
| 6,191,379 | B1 | * | 2/2001 | Offer et al. ...................... 219/75 |
| 2002/0195432 | A1 | * | 12/2002 | Sekiguchi ................ 219/121.64 |

FOREIGN PATENT DOCUMENTS

| DE | 37 10816 A1 | 10/1988 |
| EP | 331 891 A2 | 9/1989 |

OTHER PUBLICATIONS

Patent Abstracts of Japan, vol. 011, No. 360, (M-645), Nov. 25, 1987 & JP 62 137187, Jun. 20, 1987.

* cited by examiner

*Primary Examiner* — M. Alexandra Elve
(74) *Attorney, Agent, or Firm* — Griffin & Szipl, P.C.

(57) ABSTRACT

The invention relates to a laser spot welding process for executing a spot weld in two successive steps, namely a first step of preparing the surface state of the material to be welded and a second step of welding as such. The luminous energy (BR) reflected by the weld region of the material is measured in real time during the first step and then processed by a controller circuit (37) connected to a control circuit (30) of the laser source (31). In this way, the characteristics (LM) of the laser beam are adjusted in real time as a function of the measurements effected to allow effective control of the quality of the weld obtained, and in particular of its dimensions. The invention also relates to a welding device for implementing this process.

18 Claims, 3 Drawing Sheets

US 8,304,687 B2

PROCESS AND APPARATUS FOR SPOT WELDING WITH A LASER BEAM

This application claims priority from European Patent Application No. 03010716.3 of May 13, 2003, the entire disclosure of which is incorporated herein by reference.

FIELD OF THE INVENTION

The field of the present invention is that of spot welding processes and devices employing a laser beam. To be more precise, the present invention relates to a spot welding process using a laser beam in which the welding of at least one spot comprises at least a first step of preparation of the material to be welded followed by a second step of welding during which said laser beam is maintained at least partly operational. The first step is adapted to modify the surface state at least in a region of welding of the material to be welded to obtain predefined conditions suited to the implementation of the second step, at the end of which a spot weld is obtained.

BACKGROUND OF THE INVENTION

This first step is decisive for the final welding result since the surface of the material undergoes physical transformations during welding that are sometimes sudden and that may have unforeseeable consequences for the quality of the weld obtained.

At present such processes are routinely implemented using various methods of preparing the surface of the weld region before proceeding to the welding step as such.

For example, U.S. Pat. No. 5,681,490 describes a method of monitoring the quality of a weld effected by a laser beam. To this end, the document teaches measuring and analysing the values of various physical parameters that change as welding progresses, namely the energy reflected by the surface of the material to be welded, the energy transmitted through the material, and possibly the parameters of the laser beam employed.

However, the process described in the above patent has major technical limitations. This is because the results obtained from the analyses carried out are used to constitute a database of "signatures" of welds that have been executed including the associated welding parameters, the signatures providing an indication of the level of quality of the corresponding welds. The device for implementing this process consults the database during subsequent welding operations in order to use again the welding parameters that have produced welds of good quality and to attempt to reproduce the corresponding level of quality.

A major drawback of this process results from the fact that the original surface state of the material to be welded varies unpredictably. Thus welding parameters that led to a weld of good quality for a first sample of a given material will not necessarily yield a weld of good quality for a second sample of the same material.

This is why U.S. Pat. No. 5,681,490 makes further provision for detecting the quality of a weld that has just been carried out in order to rectify it should it prove to be of poor quality. Because rectifying the weld itself is not always possible, as in the particular case of overheating leading to the formation of a hole through the material, there is provision for carrying out a new weld near the spoiled first weld.

A solution of this kind is not always acceptable in relation to the required visual appearance of the weld, in particular if it is located in a portion of the corresponding final product that is visible.

SUMMARY OF THE INVENTION

One object of the present invention is to alleviate the drawbacks of the prior art mentioned hereinabove by proposing a welding process enabling better control of the quality of the welds obtained compared to the prior art.

To this end, the present invention provides a welding process of the type indicated above, characterised in that the first step comprises the following operations in order to obtain the predefined conditions before implementing the second step:
 a) directing a laser beam onto the weld region of the material to be welded,
 b) measuring the value of at least one physical parameter that is characteristic of the surface state of the material to be welded in the weld region to monitor the evolution thereof, and
 c) adjusting the characteristics of the laser beam as a function of the evolution of the value of the physical parameter determined in operation b).

The operation b) is preferably preceded by a calibration phase during which an initial value of the physical parameter is determined, the operation b) further comprising a step of processing each value of the measured physical parameter in relation to the initial value in particular, in order to define a parameter whose evolution during the first step is related to the evolution of the value of the physical parameter. The characteristics of the laser beam are therefore adjusted during the operation c) as a function of the evolution of said parameter.

Thanks to these features, the welding process of the present invention enables effective monitoring of the progress of the weld in order to adapt the parameters of the laser beam to the behaviour of each weld region. Good reproducibility of the quality of the welds carried out may be obtained in this way.

In particular, this process controls the dimensions of the spot welds obtained.

In a preferred embodiment of the process according to the present invention, there is provision for measuring the level of energy reflected by the material to be welded and adjusting the power of the laser beam emitted accordingly and in real time.

There is further provision for measuring the power of the laser beam used to irradiate the material to be welded in such a manner as to achieve finer adjustment of its value and thereby to improve the level of monitoring of the welding.

The process according to the present invention is particularly well adapted to welding metal parts, for example copper parts, copper being a metal that is difficult to weld.

The present invention also provides a device for implementing the process previously described.

BRIEF DESCRIPTION OF THE DRAWINGS

Other features and advantages of the present invention will become more clearly apparent on reading the following detailed description with reference to the appended drawings, which are provided by way of non-limiting example and in which.

DETAILED DESCRIPTION OF THE PREFERRED EMBODIMENTS

Figure 1:
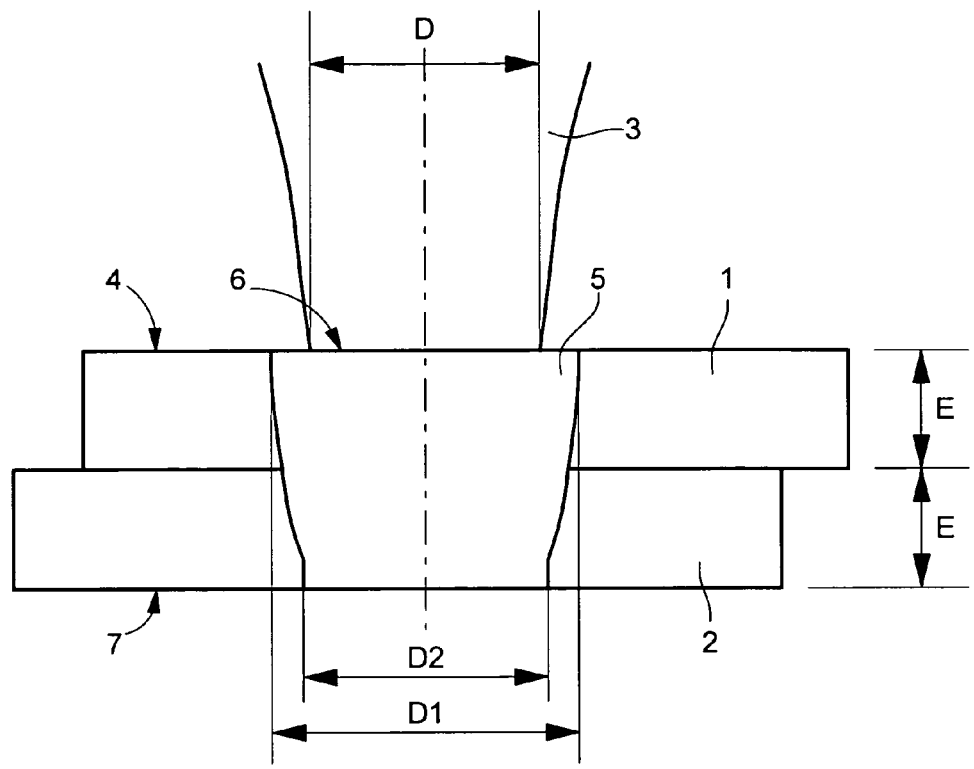
FIG. 1 represents diagrammatically two members intended to be welded.

FIG. 1 depicts a conventional arrangement of two members adapted to be welded together. The two members may be two metal plates or sheets, for example. A first plate 1 is placed on top of a second plate 2 and a laser beam 3 is directed onto the upper face 4 of the first plate at normal incidence to execute a weld.

By way of non-limiting example, the plates 1 and 2 may typically be of copper with a thickness E of a few tens of μm, the laser beam having a diameter D of the order of 200 μm.

During welding of the plates 1 and 2, a region 5 of molten metal is formed on the first plate 1 in the region 6 of impact of the laser beam 3. While the laser beam is maintained, the heat supplied to the first plate 1 is transmitted to the second plate 2 and the molten metal region 5 expands in the direction of the thickness of the plates 1 and 2 until it reaches the lower surface 7 of the second plate 2, as shown in FIG. 1.

The power of the laser beam 3 is then usually reduced progressively, to allow the molten metal region 5 to solidify to form the weld, without causing tension stresses to occur in the weld.

It may be noted that, the higher the power of the laser beam 3 during the formation of the molten metal region 5, the greater is the heat transmitted to the plates 1 and 2. Thus a higher laser beam power during this welding step will lead to the formation of a molten metal region with larger transverse dimensions, at least in the first plate 1.

Following numerous experiments, the Applicant has found that the transverse dimension D2 of the weld at the level of the lower surface 7 of the second plate 2 is directly related to its transverse dimension D1 at the level of the upper surface 4 of the first plate 1. Consequently, the transverse dimension D1 of the weld at the level of the surface of the first plate constitutes a major weld quality criterion that has to be taken into account and which itself depends on the dimension D2 of the weld at the level of the lower surface of the second plate. It is for this reason that the Applicant has developed the welding process according to the present invention, which provides reliable control over the dimension D1 of the weld at the level of the surface 4 of the first plate 1 while the weld is being formed.

The Applicant has found in particular that the first step of the welding process has a dominant role in the regulation of the final dimension D1 of the weld at the level of the surface of the first plate.

Figure 2:
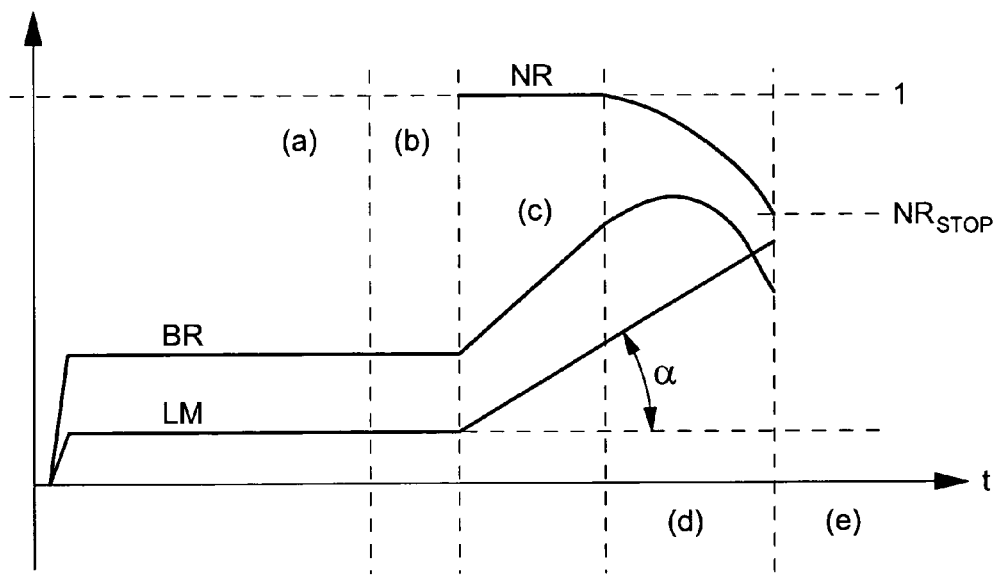
FIG. 2 is a schematic drawing explaining the strategy employed in a first step of the welding process according to the present invention.

The strategy depicted in FIG. 2 has therefore been developed for implementing the welding process according to the present invention, more particularly with regard to the first welding step, in other words the step of preparing the material to be welded.

FIG. 2 shows one example of a preferred profile for the power of the laser beam 3 (curve LM) as a function of time during the first welding step and the corresponding profile of the beam reflected by the material to be welded (curve BR). The first step of the welding process according to the present invention preferably comprises four phases (a) to (d) (FIG. 2), followed by the second step (e) that corresponds to welding proper.

The phases (a) and (b) constitute preliminary phases of preparation of the surface of the material to be welded during which the material to be welded is heated by the laser beam at a power lower than the minimum power required to melt the material. For example, if the material to be welded is copper, the power of the laser beam is limited to 0.5 kW during phases (a) and (b).

During a first time period, which corresponds to the phase (a), this preliminary heating cleans the surface of the material to be welded by eliminating deposits of impurities or oxides.

The phase (b), which has a duration of the order of one millisecond, constitutes a calibration phase that is also used to measure the reflectivity of the surface of the material to be welded while it is still at a temperature significantly lower than its melting point. The mean value R0 of the ratio BR(t)/LM(t) during the phase (b) is calculated and is used in the remainder of the first step of the welding process to define a parameter corresponding to a normalised ratio NR(t) that is equal to R(t)/R0, i.e. [BR(t)/LM(t)]*1/R0.

The value obtained for R0 is used to define a slope (the angle $\alpha$ in FIG. 2) for the curve LM(t) representing the power of the laser beam emitted as a function of time. Thus a material having a low reflectivity, i.e. a high capacity to absorb the energy of the incident laser beam, will lead to a slower increase in the power of the laser beam emitted, i.e. to a lower value of $\alpha$, than a material having a high reflectivity.

In this way the first step of the welding process according to the present invention is adapted to the "real" physical properties of the material to be welded and not to a database of physical properties of materials.

Furthermore, it may be noted that this strategy maintains a substantially constant value of the time necessary for heating the material to be welded, regardless of the physical properties of its surface, and therefore does not significantly slow the process in the case of a material with high reflectivity.

Once the value of R0 has been determined, the power of the laser beam is increased in a substantially linear manner throughout the phase (c) (FIG. 2), the rate of increase of the power being a function of the value of R0, as mentioned above.

During the phase (c), the material to be welded is heated in the region that will constitute the weld at the end of the welding process, without suffering significant physical modification from the point of view of its reflectivity.

Consequently, during the phase (c), the standardised ratio NR(t) does not vary significantly and its value remains close to 1, as shown in FIG. 2.

After a certain time period, of the order of a few milliseconds, the material begins to melt in the impact region of the laser beam, which in the FIG. 2 curve is reflected in a drop in the value of BR(t) in the phase (d) as the material absorbs more energy to effect the phase change.

As can be seen in FIG. 2, the reduction of the value of BR(t) leads to a reduction of the value of NR(t).

The power of the laser beam being usually greater at its centre than towards its edges, the material begins to melt at the centre of the impact region of the laser beam, which corresponds to the change in the shape of the curve for BR(t).

At this stage, the power of the laser beam continues to increase, to expand the molten material region in the plane of the surface of the material to be welded. At the same time, the reflectivity continues to decrease, since the area of molten material increases, absorbing a greater amount of energy.

The phase (d) terminates when the normalised ratio reaches a predetermined value $NR_{STOP}$ (FIG. 2), the laser beam being stopped in the situation represented in FIG. 2. In practice, the laser beam is not completely stopped when NR(t) reaches its cut-off value $NR_{STOP}$, but rather its power is reduced (see below).

The welding process according to the present invention achieves good reproducibility of weld quality over a wide range of values of $NR_{STOP}$. Furthermore, the transverse dimensions of the weld obtained at the end of the process are closely related to the value adopted for $NR_{STOP}$.

Figure 3:
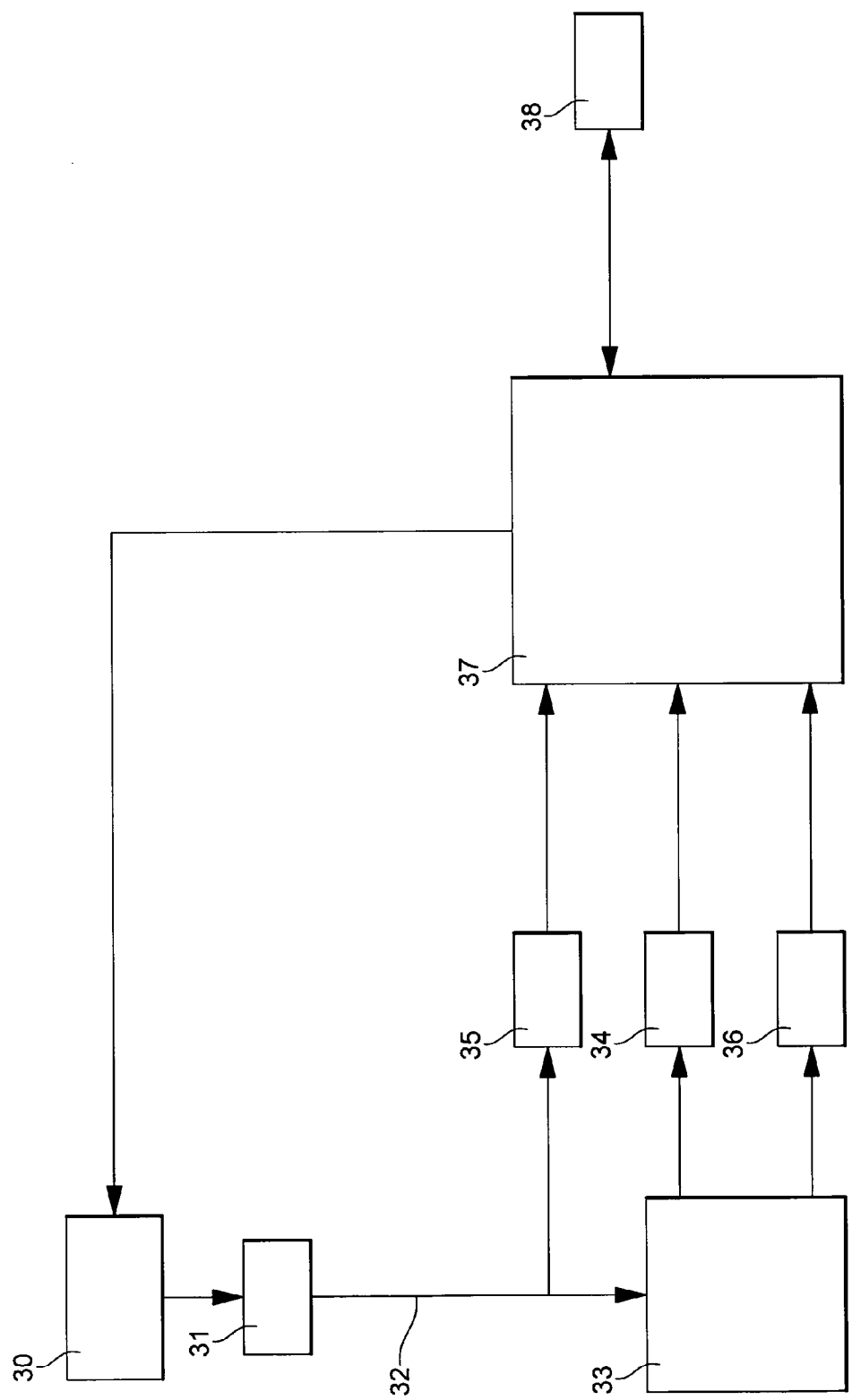
FIG. 3 shows diagrammatically one embodiment of a device for implementing the process according to the present invention.

FIG. 3 shows a preferred embodiment of a welding device for implementing the process just described.

The device comprises a control circuit 30 for a laser source 31 emitting a laser beam 32 onto a region 33 of a material to be welded.

A photo-electric sensor 34 collects the energy reflected by the surface of the material, previously denoted BR(t). This sensor may be of any appropriate type, such as a photodiode or a phototransistor, for example, and is preferably disposed substantially vertically above the impact region of the laser beam on the material to be welded. The photoelectric sensor 34 is preferably in the laser head (not shown) emitting the laser beam, but this is not limiting the invention.

The welding device according to the present invention advantageously further comprises an additional photo-electric sensor 35 for measuring the power level of the laser beam between the exit from the source and its impact on the material to be welded.

In a different embodiment of the welding device according to the present invention, at least one conventional heat or infrared sensor 36 may additionally be provided for continuously determining the temperature of the impact region of the laser beam on the surface of the material to be welded.

Each of the sensors 34 to 36 produces an electrical signal representative of the parameter that it measures, all of these signals being sent to a processor 37 programmed to process all of this information. On the basis of the result obtained by processing the information, the processor 37 sends an appropriate command signal to the control circuit of the laser source 30 to adjust the characteristics of the laser beam emitted. In particular, the control signal from the processor 37 is used to adjust the power of the laser beam emitted, previously denoted LM(t), but adjusting the pulse frequency thereof or the location of the focal plane of the beam, for example, may equally be envisaged.

Moreover, there is advantageously provision for controlling the processor 37 by means of a PC 38 running an appropriate program that is not described in more detail here because the person skilled in the art will find no particular difficulty in implementing it. Thus the computer enables the user of the welding device according to the present invention to employ a user-friendly interface in a known manner to control the welding process.

It may be noted that the type of laser source chosen is of little importance with respect to the implementation of the welding process according to the invention. Any laser source having an appropriate power and an appropriate wavelength may be used, for reasons of cost, conventional optically pumped Nd:YAG laser sources are preferred at present over other laser sources, such as Nd:YAG lasers pumped by a laser diode, or stacks of laser diodes.

Figure 4:
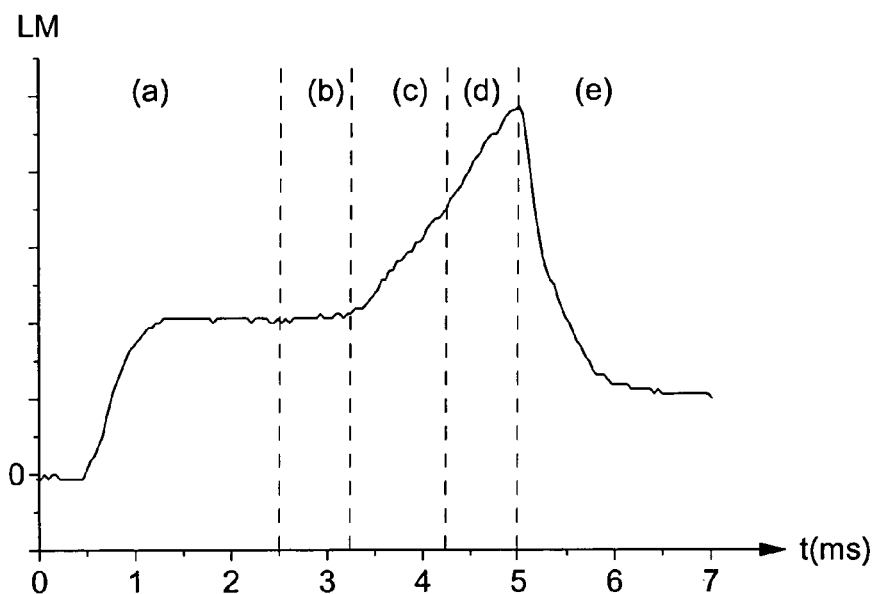
FIG. 4 is a diagram representing one example of the power level of the laser beam emitted onto a material to be welded during the first step of the welding process according to the present invention.
Figure 5:
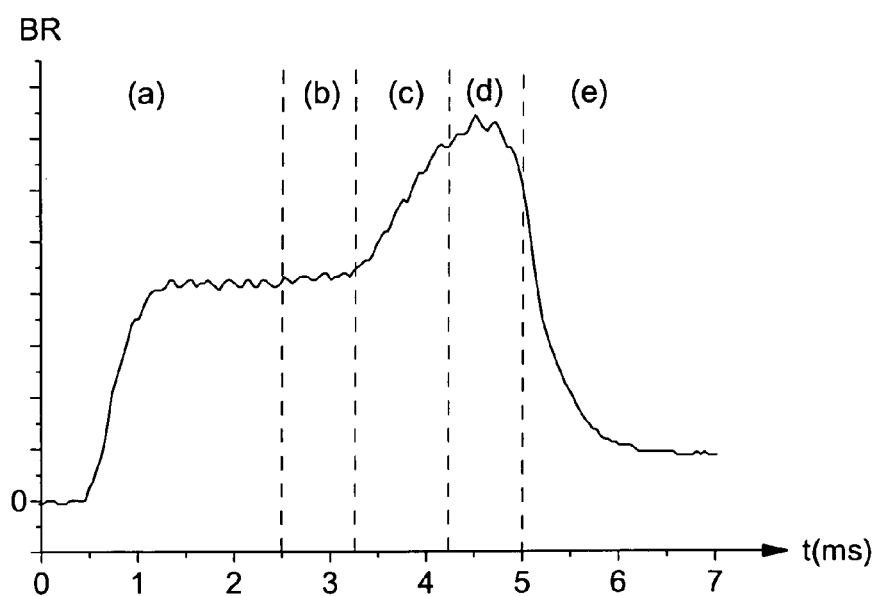
FIG. 5 is a diagram representing the level of energy reflected by the surface of the material to be welded during the first step of the welding process, corresponding to the FIG. 4 laser beam.

FIGS. 4 and 5 represent experimental curves for the power LM(t) of the laser beam and the power BR(t) of the wave reflected by the surface of the material to be welded, respectively. The phases (a) to (e) of the welding process as described with reference to FIG. 2 are represented in FIG. 4, their total duration being of the order of 6 milliseconds.

FIG. 4 shows again the trend of the FIG. 2 curve of the power of the laser beam emitted by the laser source 31, with the phase (a) of preparing the surface of the material to be welded, the phase (b) of measuring the reflectivity of the material at a temperature significantly lower than its melting temperature, and the phases (c) and (d) of heating the material to be welded. Note, in combination with FIG. 5, that the phase (d) extends from approximately 4.2 ms to approximately 5 ms and corresponds to the moment at which the rise in the reflectivity curve BR(t) slows to the point of decreasing, a phenomenon related to the beginning and subsequent expansion of melting of the material to be welded.

Note further, in FIGS. 4 and 5, that during the second step of the welding process, corresponding to the phase (e) of FIGS. 2 and 4, the laser beam is not completely interrupted in the manner represented in FIG. 2.

This is because the phase (e) in practice corresponds to the step of welding as such, and the material still needs to be heated during this step for the region of molten material to propagate into the thickness, from the surface (denoted 4 in FIG. 1) comprising the impact region of the laser beam, as far as the opposite surface (denoted 7 in FIG. 1), to complete the weld.

Nevertheless, the transition between the phases (d) and (e) is effected with a fast reduction in the power of the laser beam, by at least 10% of its value, in particular to allow the dissipation of a plasma formed during the preceding phases that masks the impact region of the laser beam on the surface of the material to be welded and causes liquid metal to be ejected out of the weld region.

A preferred embodiment of the invention concerning the second step comprises an operation consisting in monitoring the temperature of the surface of the material to be welded, using the infrared sensor 36 to maintain the latter temperature substantially constant. This is because the Applicant has found that a strategy of this kind achieves a good quality weld, in particular good correlation between the respective dimensions at the levels of the upper surface and the lower surface of the weld.

During a final step (not shown), the power of the laser beam is progressively reduced to zero to allow sufficiently slow cooling of the material for no tension stresses to occur in the resolidified material.

As mentioned above, the welding process according to the present invention guarantees effective and reliable control over the dimensions and the quality of the welds obtained.

By way of example, the table below summarises the results of numerous experiments carried out by the Applicant to confirm the effectiveness of the welding process.

The table gives the dimensions obtained for a weld under the conditions explained hereinabove, for a value of the normalised cut-off ratio $NR_{STOP}$ of the laser beam varying from 40% to 90%, with the diameter of the laser beam at the surface of the material set to 200 µm. The laser source employed was of the Nd:YAG type and the welds were simulated on a single copper sheet 100 µm thick with a lightly oxidised surface.

The various columns of the table comprise the respective values of the normalised cut-off ratio $NR_{STOP}$ of the laser beam, the mean value p of the diameter of the weld obtained measured at the level of the surface 4 (FIG. 1), the standard deviation σ for each value of $NR_{STOP}$, the relative standard deviation σ/µ for each value of $NR_{STOP}$, the minimum diameter Dmin measured, the maximum diameter Dmax measured, the extent ΔD calculated for each value of $NR_{STOP}$, and the number N# of measurements effected for each value of $NR_{STOP}$.

| $NR_{STOP}$ | μ (μm) | σ (μm) | σ/μ | Dmin (μm) | Dmax (μm) | ΔD (μm) | N# |
|---|---|---|---|---|---|---|---|
| 90% | 105.3 | 19.3 | 18.3% | 45 | 158 | 113 | 50 |
| 80% | 152.9 | 7.4 | 4.8% | 136 | 167 | 31 | 50 |
| 70% | 175.4 | 5.5 | 3.1% | 162 | 187 | 25 | 50 |
| 60% | 201.8 | 9.4 | 4.7% | 184 | 225 | 41 | 50 |
| 50% | 242.8 | 8.1 | 3.4% | 229 | 268 | 39 | 50 |
| 40% | 273.3 | 9.5 | 3.5% | 255 | 295 | 40 | 50 |
| Without control | 247.4 | 35.8 | 14.5% | 149 | 329 | 180 | 50 |

Note that the lower the value of $NR_{STOP}$, the longer the heating of the material to be welded continues, starting from the formation of the molten material region, as is clear from FIG. 2.

The last row of the table corresponds to a series of measurements carried out without taking account of the evolution of the signal BR(t), i.e. by using exactly the same laser pulse for all the measurements of the series. The high values of the standard deviation and the extent for this series of measurements reveal the importance of the original surface state of the material to be welded in relation to controlling the result of the welding. This series of measurements, using a prior art welding process, in fact proves that it is difficult to achieve good reproducibility of the dimensions of the weld if the original surface state of the material to be welded is not taken into account in the preparatory first step.

Similarly, it is found that, for a normalised cut-off ratio set at 90%, the reproducibility of the results is poor. The diversity of the values obtained for the dimensions of the welds in this first series of measurements also demonstrates the importance of taking into account the original surface state of the material to be welded. In this case, the heating phase with the power of the laser beam increasing is too short to eliminate the diversity of the respective surface states of the various regions in which the welds are effected.

The poor results obtained for this series of measurements must nevertheless be seen in the context of the value calculated for the mean diameter of the weld (105.3 μm) being slightly on the low side for a weld as routinely encountered in practice.

With regard to values of $NR_{STOP}$ less than 90%, on the other hand, it is found that the results of the respective series of measurements show significantly improved reproducibility relative to the prior art welding process.

All the relative standard deviation values calculated are below 5%, a result deserving comparison with the 14.5% of the prior art process, and which confirms the effectiveness of the welding process according to the present invention.

The preceding description corresponds to preferred embodiments of the invention and should in no circumstances be regarded as limiting on the invention.

The person skilled in the art may select a particular type of laser source, the nature of the materials to be welded, or the nature and number of sensors employed different from those described above, without departing from the scope of the present invention.

In particular, the welding process according to the present invention is advantageous for welding the following materials in addition to copper: aluminium, gold, silver, cuproberyllium (CuBe), brass and bronze.

Many applications may be envisaged for the welding process according to the present invention, such as welding printed circuit paths, thin metal tapes or wires.

What is claimed is:

1. A spot welding process using a laser beam in which the welding of two members by spot welds comprises, for each spot weld, a first step of preparation by said laser beam of a weld region in which the spot weld will occur, followed by a second step of welding by said laser beam, said first step being adapted to modify a surface state in said weld region to obtain predefined conditions suited to the implementation of said second step, said first step comprising the following operations:
   a) directing said laser beam onto said weld region,
   b) measuring the value of at least one physical parameter that is characteristic of the surface state of said weld region to monitor the evolution thereof, and
   c) adjusting, during said first step, the characteristics of said laser beam as a function of the evolution of the value of said physical parameter, determined in operation b), in order to obtain said predefined conditions before implementing said second step.

2. The welding process according to claim 1, wherein, during said first step, the operation b) is preceded by a calibration phase during which an initial value of said physical parameter is determined, the operation b) further comprising a step of processing each value of said measured physical parameter in relation to said initial value in particular, in order to define a parameter whose evolution during said first step is related to the evolution of the value of said physical parameter, the characteristics of the laser beam being adjusted during the operation c) as a function of the evolution of said parameter.

3. The welding process according to claim 2, wherein said predefined conditions comprise the dimension, within said weld region, of a zone brought to a molten state at the end of said first step, said dimension being a function of the value of said calculated parameter at the end of said first step.

4. The welding process according to claim 3, wherein, after said calibration phase, the power emitted by the laser beam onto said weld region is increased, preferably in a substantially linear manner as a function of time.

5. The welding process according to claim 3, wherein said physical parameter whose value is measured evolves during said first step in a manner that is related to the evolution of the level of light reflected by said, weld region.

6. The welding process according to claim 5, wherein said physical parameter is measured in a direction substantially normal to the surface of said weld region.

7. The welding process according to claim 5, wherein the power of the laser beam is one of said characteristics of the laser beam which are adjusted during the operation of adjusting the characteristics of the laser beam as a function of the evolution of the value of said physical parameter determined in operation b).

8. The welding process according to claim 3, wherein the power of the laser beam is reduced by at least 10% in response to obtaining a predefined value of the defined parameter in said processing step, said predefined value corresponding to the end of said first step.

9. The welding process according to claim 3, wherein the value of an additional physical parameter, the evolution of which is related to the evolution of the temperature of said weld region, is also measured during the operation b) and taken into account to improve the setting of the characteristics of the laser beam in the operation of adjusting the characteristics of the laser beam as a function of the evolution of the value of said physical parameter determined in operation b).

10. The welding process according to claim 3, wherein the operations a) to c) are effected continuously throughout said first step.

11. The welding process according to claim 1, wherein said two members are formed by a metal or a metal alloy.

12. The welding process according to claim 11, wherein said metal and said metal alloy are chosen in the groups respectively comprising copper, silver, gold, aluminium and cuproberyllium, brass, bronze.

13. A spot welding device employing a laser beam and comprising:
- a laser source capable of emitting a laser beam in the direction of at least one weld region of a material to be welded,
- a control circuit of the laser source,
- regulation means for executing a spot weld in two successive steps, including a first or preparation step adapted to modify a surface state of said material to be welded in said weld region to obtain predefined conditions suited to the implementation of a second step comprising welding as such,
- said laser beam being directed during said first step onto said weld region of the material to be welded,
- said laser beam being used for welding during said second step in order to obtain a spot weld at the end of said second step,
- said regulation means comprising
- means for measuring at least the value of a physical parameter characteristic of the surface state of the material to be welded in said weld region and producing a first signal representative of said measured value, and
- a processor receiving the first signal and able to monitor the evolution of the value of said physical parameter, the processor being also adapted to produce during said first step a second signal that is a function of the evolution of the value of said physical parameter and to send this second signal to the control circuit of the laser source during said first step, in order to adjust the characteristics of said laser beam emitted during said first step to obtain said predefined conditions before implementing said second step.

14. The device according to claim 13, wherein said regulation means comprise a first optical sensor for measuring the value of a physical parameter whose evolution is related to the evolution of the level of light reflected by the material to be welded.

15. The device according to claim 14, wherein said regulation means further comprise a second optical sensor for measuring the power of the laser beam emitted on the optical path thereof between the laser source and the weld region.

16. The device according to claim 14, wherein said regulation means comprise an infrared radiation sensor for measuring the evolution of the temperature in said weld region.

17. The device according to claim 16, wherein it comprises a machining head from which said laser beam is emitted out of the device and in which all of said sensors are arranged.

18. The device according to claim 13, wherein it is connected to a computer for controlling it via a suitable interface.

* * * * *